United States Patent [19]

Murschall et al.

[11] Patent Number: 5,683,802

[45] Date of Patent: Nov. 4, 1997

[54] HEAT-SEATABLE OR NON-HEAT-SEALABLE, ORIENTED, MULTILAYER POLYOLEFIN FILM COMPRISING CERAMIC PARTICLES

[75] Inventors: Ursula Murschall, Nierstein; Herbert Peiffer, Mainz; Gunter Schloegl, Schwabenheim, all of Germany

[73] Assignee: Hoechst Aktiengesellschaft, Germany

[21] Appl. No.: 404,973

[22] Filed: Mar. 16, 1995

[30] Foreign Application Priority Data

Mar. 17, 1994 [DE] Germany ............... 44 09 199.2
Mar. 17, 1994 [DE] Germany ............... 44 09 118.4

[51] Int. Cl.$^6$ ............................... B32B 5/16
[52] U.S. Cl. ............... 428/325; 428/331; 428/404; 428/406; 428/407; 428/511; 428/516; 428/517; 428/521
[58] Field of Search ............... 428/325, 331, 428/403, 404, 406, 407, 500, 511, 515, 516, 517, 521

[56] References Cited

U.S. PATENT DOCUMENTS

| | | | |
|---|---|---|---|
| 3,655,503 | 4/1972 | Stanley et al. | 161/165 |
| 4,117,193 | 9/1978 | Tsuchiya et al. | 428/339 |
| 4,375,989 | 3/1983 | Mäkinen | 106/300 |
| 4,419,411 | 12/1983 | Park | 428/516 |
| 4,447,271 | 5/1984 | Howard et al. | 106/300 |
| 4,582,736 | 4/1986 | Duncan | 428/40 |
| 4,622,237 | 11/1986 | Lori | 427/40 |
| 4,769,418 | 9/1988 | Mizuno et al. | 525/106 |
| 4,911,976 | 3/1990 | Park et al. | 428/216 |
| 4,912,091 | 3/1990 | Bothe et al. | 428/35.2 |
| 4,966,933 | 10/1990 | Kawakami et al. | 524/310 |
| 5,110,671 | 5/1992 | Balloni et al. | 428/218 |
| 5,137,955 | 8/1992 | Tsuchiya et al. | 524/310 |
| 5,175,051 | 12/1992 | Schloegl et al. | 428/323 |
| 5,236,680 | 8/1993 | Nakazawa et al. | 423/328.1 |
| 5,246,763 | 9/1993 | Murschall et al. | 428/195 |
| 5,254,393 | 10/1993 | Murschall et al. | 428/212 |
| 5,254,394 | 10/1993 | Bothe et al. | 428/212 |
| 5,468,527 | 11/1995 | Peiffer et al. | 428/35.7 |
| 5,484,633 | 1/1996 | Murschall et al. | 428/35.7 |

FOREIGN PATENT DOCUMENTS

| | | |
|---|---|---|
| 2113685 | 7/1994 | Canada . |
| 2116183 | 8/1994 | Canada . |
| 2 115 817 | 9/1994 | Canada . |
| 2 116 182 | 9/1994 | Canada . |
| 2 122 887 | 11/1994 | Canada . |
| 0 044 515 | 1/1982 | European Pat. Off. . |
| 0 078 633 | 5/1983 | European Pat. Off. . |
| 0 143 130 | 6/1985 | European Pat. Off. . |
| 0 182 463 | 5/1986 | European Pat. Off. . |
| 0 234 758 | 9/1987 | European Pat. Off. . |
| 0 242 055 | 10/1987 | European Pat. Off. . |
| 0 353 368 | 2/1990 | European Pat. Off. . |
| 0 402 100 | 12/1990 | European Pat. Off. . |
| 0 430 472 | 6/1991 | European Pat. Off. . |
| 0 612 613 | 8/1994 | European Pat. Off. . |
| 0 613 770 | 9/1994 | European Pat. Off. . |
| 0 613 771 | 9/1994 | European Pat. Off. . |
| 0 614 755 | 9/1994 | European Pat. Off. . |
| 0 623 463 | 11/1994 | European Pat. Off. . |
| 2 001 032 | 7/1970 | Germany . |
| 38 01 535 | 7/1988 | Germany . |
| 43 06 154 | 9/1994 | Germany . |
| 5163392 | 6/1993 | Japan . |

OTHER PUBLICATIONS

Patent Abstracts of Japan, vol. 17, No. 567 & JP-A-05 163 392, Jun. 29, 1993.

*Primary Examiner*—H. Thi Le
*Attorney, Agent, or Firm*—Connolly & Hutz

[57] ABSTRACT

The disclosed oriented, multilayer olefin polymer film comprises an olefin polymer base layer and at least one outer layer, which outer layer contains from 0.01 to 1% by weight, based on the weight of the outer layer, of approximately spherical ceramic particles. The outer layer can be heat-sealable or non-heat-sealable. The multilayer olefin polymer film is produced by a coextrusion process in which the coextruded film is biaxially stretched, heat-set, and optionally surface-treated. The resulting film is useful in packaging and as a printing surface or in laminates.

15 Claims, No Drawings

HEAT-SEATABLE OR NON-HEAT-SEALABLE, ORIENTED, MULTILAYER POLYOLEFIN FILM COMPRISING CERAMIC PARTICLES

FIELD OF THE INVENTION

The invention relates to an oriented, multilayer olefin polymer film comprising an olefin polymer-containing base layer and at least one outer layer, which can be heat-sealable or non-heat-sealable. The films are distinguished by low haze, high gloss and a low coefficient of friction.

DESCRIPTION OF THE PRIOR ART

The prior art describes transparent films having low coefficients of friction. The demands on the processing properties of the films and their smooth running through automatic machines have constantly increased over the years. For this reason, ever-lower coefficients of friction are required, with the term "low" friction values today covering an order of magnitude of from 0.3 to 0.1, while a friction of from 0.4 to 0.5 was regarded as extremely low a few years ago.

DE-A-20 01 032 describes films made from various thermoplastics whose surface-slip characteristics have been improved by addition of carboxamides and antiblocking agents. Since it is not possible for a sufficient amount of lubricant to be incorporated into the outer layers alone, the additional incorporation of the amides into the base layer is recommended. These films have a coefficient of friction in the range from 0.4 to 0.8 and thus no longer meet today's quality requirements.

U.S. Pat. No. 4,117,193 describes multilayer films comprising a polypropylene base layer containing a lubricant, an antiblocking agent and an antistatic. The outer layer of these films comprises a polymer blend and additionally contain a lubricant and an antiblocking agent. The polymer blend comprises an ethylene-butylene copolymer and a polyolefinic resin such as HDPE or LDPE. It is stated that the poor surface-slip characteristics of the films cannot be sufficiently improved by the addition of lubricants and antiblocking agents alone. For this reason, the outer layer is modified by addition of HDPE or LDPE in combination with a lubricant and antiblocking agent. According to the examples and comparative examples, the reduction in the coefficient of friction is essentially due to the addition of HDPE. Pure copolymeric outer layers with the same additive composition have coefficients of friction of from 0.7 to 0.8. The films combine excellent coefficients of friction with good printability, but are highly unsatisfactory in haze and gloss owing to the addition of the friction-reducing polyolefinic resin.

EP-A-0 402 100 describes polypropylene films which contain from 0.01 to 0.5% by weight of a spherical $SiO_2$ and from 0.3 to 5% by weight of a hydroxyfatty acid glyceride. This invention relates to single-layer and multilayer films. Multilayer embodiments contain the combination of $SiO_2$ and glyceride both in the outer layer and in the base layer. It is stated that the selected amounts of $SiO_2$ and glyceride are essential for the advantageous properties of the films and deviations from these ranges no longer give the desired result. The films are distinguished by good transparency, surface-slip characteristics and adhesion to metal. However, they have a coating on the surface after an extended storage time which impairs the appearance of the films. This effect is also known as blooming and is caused by migration of certain additives, in particular the glycerides, to the surface of the films.

EP-A-0 182 463 describes a multilayer film which contains from 0.05 to 0.2% by weight of tertiary aliphatic amine in the base layer and a combination of silicone oil and $SiO_2$ in the heat-sealable outer layer. According to the description, the surprising interaction of $SiO_2$, silicone oil and amine in combination with a selected outer layer thickness of less than 0.8 μm gives films having coefficients of friction of 0.3 or less. In spite of this excellent coefficient of friction, the processing properties of the film are poor. In particular, it is not printable and is therefore unsuitable for many applications.

EP-A-0 143 130 discloses films which contain a carboxamide in the base layer and likewise the combination of silicone oil and $SiO_2$ in the outer layer. Like in the above-mentioned EP-A-0 182 463, a synergistic action of the three selected components on the coefficient of friction is described. These films likewise have poor processing properties in spite of their advantageous surface-slip characteristics. Again, they lack the important property of printability.

EP-A-0 124 310 describes films having low coefficients of friction which comprise a thick base layer and a thin outer layer containing finely divided inorganic particles. As inorganic particles, $SiO_2$, aluminum silicates, sodium aluminum silicates and carbon black are mentioned. The particle size is in the range from 0.2 to 5.0 μm. The particles have an advantageous effect on the coefficient of friction of the film. However, the film is still highly unsatisfactory with respect to its roll make-up and flat lying.

EP-A-0 350 168 describes a film having differentiated surface-slip characteristics of the two surfaces. The outer layers are heat-sealable and contain $SiO_2$ as antiblocking agent.

EP-A-0 234 758 describes a multilayer polyolefin film having a good absorption capacity for water-based coatings. The polypropylene outer layer contains an antiblocking agent and silicone oil. As suitable antiblocking agents, $SiO_2$, silicates, chalk, clay and the like are described without detailed information on the particle size of the various antiblocking agents.

DE-A-35 17 795 describes multilayer polypropylene films whose outer layer contains a combination of amine, polydialkylsiloxane and platelet-shaped inorganic pigment. The film is distinguished by good antiblocking and surface-slip characteristics. The platelet-shaped pigment has a leaf structure. Suitable pigments are silicates and carbonates.

EP-A-0 242 055 describes the use of an infusible, organosiloxane resin powder having a three-dimensional network structure as antiblocking agent in films. Both the silicone resin and the propylene polymer are employed in the form of a powder comprising particles having a virtually spherical shape, this particle shape being characterized by an appropriate equation for the actual degree of sphericalness. The films are said to be improved compared with the prior art with respect to their transparency, antiblocking properties, surface-slip characteristics and appearance. The propylene/antiblocking agent mixture can also be employed as outer-layer material for coextruded multilayer films. However, these coextruded multilayer films are still unsatisfactory with respect to their transparency and their gloss values, in particular when the outer layers are applied in conventional layer thicknesses of greater than 0.5 μm. In addition, this antiblocking agent is very much more expensive than conventional antiblocking agents.

German Patent Application P 43 06 154.0 describes the use of an organically coated $SiO_2$ as antiblocking agent in heat-sealable films. The coefficient of friction and the processing properties of the film are improved. This publication makes no mention of the spatial shape of the antiblocking particles.

EP-A-0 353 368 describes the use of the siloxane resin powder described in EP-A-0 242 055, in combination with a hydroxyfatty acid glyceride. These films are particularly suitable for vacuum vapor deposition, but are very poor with respect to their gloss and transparency.

By applying the known teaching, it has been found that some known antiblocking agents have adverse effects on certain film properties. The antiblocking agent impairs the transparency and the gloss of the film. The improvement in friction is generally accompanied by an increase in surface roughness. During production of the films, $SiO_2$ as antiblocking agent causes deposits on the die lip and abrasion on the rolls. This means that the die lip and the rolls must be cleaned frequently, since the film otherwise runs poorly during production and the deposits on the die lip result in streaking on the film. In addition, problems occur during corona treatment. The corona treatment breaks through in the areas of the roll where $SiO_2$ abrasion has occurred and results in the undesired phenomenon known as the reverse-side effect. This causes unacceptable flaws during further processing of the film, such as, for example, printing or metallization.

An objective of the present invention was therefore to avoid the disadvantages of the films previously described in the prior art; in particular, an important aim is to provide a multilayer film which is distinguished by a combination of the following properties, both in the embodiment of this invention having a heat-sealable outer layer (hereafter referred to as the "heat-sealable embodiment"), and in the embodiment having a non-heat-sealable outer layer (hereafter referred to as the "non-heat-sealable embodiment"):

high gloss
low haze
a low coefficient of friction
low surface roughness.

In the non-heat-sealable embodiment of this invention, it is also an objective of this invention to provide a multilayer film in which the aforementioned combination of properties includes low abrasion.

SUMMARY OF THE INVENTION

An oriented, multilayer olefin polymer film of this invention comprises an olefin polymer-containing base layer and at least one heat-sealable outer layer, in the case of the heat-sealable embodiment of the invention; in the non-heat-sealable embodiment of this invention, the multilayer olefin polymer film comprises the base layer and a non-heat-sealable outer layer. In either embodiment a said outer layer contains from 0.01 to 1% by weight, based on the weight of this layer, of approximately spherical ceramic particles which preferably have a mean particle diameter of from 0.5 to 10 μm, particularly preferably 1 to 5 μm. These particles can comprise sodium and/or aluminum silicate (including mixed sodium-aluminum silicates) and are preferably essentially free of crosslinked silicone resin.

The invention also relates to a process for the production of the heat-sealable and non-heat-sealable embodiments of the multilayer film of this invention by a coextrusion process in which the polymer or polymer mixture of individual layers is compressed and liquefied in an extruder, it being possible for any additives already to be present in the polymer or in the polymer mixture or can be added via the masterbatch method. The melts corresponding to the individual layers of the film are then simultaneously coextruded through a die, and the extruded multilayer film is taken off over one or more take-off rolls, during which it cools and solidifies; the resultant film is then biaxially stretch oriented, e.g. from 4:1 to 7:1 in the longitudinal direction and from 7:1 to 11:1 in the transverse direction.

The biaxial stretching of the film can be followed by heat setting, during which the film is kept at a temperature of from 100° to 160° C. for from about 0.5 to 10 seconds. The film is subsequently wound up in the conventional manner using a wind-up unit.

In the non-heat-sealable embodiment of this invention, which can be transparent, the outer layer is preferably a homopolymer or a polymer which is substantially homopolymeric (e.g. a polymer in which the predominant monomeric unit is an olefin such as propylene). Surprisingly, the incorporation of the approximately spherical ceramic particles into such an outer layer causes only little impairment of the excellent transparency of the film. It is known from the prior art that the incorporation of particulate fillers into a homopolymer base layer during stretching results in the formation of vacuole-like cavities in the layer (EP-A 0 083 495). The larger the particle size of the fillers, the larger the resultant vacuoles. These filler-containing films are virtually non-transparent owing to the vacuoles and have a characteristic opaque appearance. It was therefore extremely surprising that the transparency of the non-heat-sealable embodiment of films of this invention is virtually unimpaired, since a person skilled in the art would have expected the formation of vacuoles in the homopolymer (or substantially homopolymeric) outer layer due to the spherical particles and thus considerable hazing of the film. It has furthermore been found, entirely unexpectedly, that the non-heat-sealable embodiment of the film exhibits virtually no abrasion phenomena during production or further processing.

DETAILED DESCRIPTION

An essential and preferably predominant component of the "base layer" (the largest or one of the largest and generally the innermost layer) of a multilayer film of this invention is an olefin polymer, preferably a propylene polymer. The base layer can optionally comprise further additives, in effective amounts in each case. In general, the base layer comprises at least 50% by weight, preferably from 75 to 100% by weight, in particular from 90 to 100% by weight, of the propylene polymer.

The propylene polymer generally comprises from 90 to 100% by weight, preferably from 95 to 100% by weight, in particular from 98 to 100% by weight, of propylene and generally has a melting point of 120° C. or above, preferably from 150° to 170° C., and generally has a melt flow index from 0.5 g/10 min to 8 g/10 min, preferably from 2 g/10 min to 5 g/10 min, at 230° C. and a force of 21.6N (DIN 53 735). Isotactic propylene homopolymer having an atactic content of 15% by weight or less, copolymers of ethylene and propylene having an ethylene content of 10% by weight or less, copolymers of propylene with $C_4$–$C_8$-α-olefins having an α-olefin content of 10% by weight or less, terpolymers of propylene, ethylene and butylene having an ethylene content of 10% by weight or less and a butylene content of 15% by weight or less are preferred propylene polymers for the core layer, particular preference being given to isotactic propylene homopolymer. The percentages by weight stated are based on the particular polymer.

As used in this application, the term "polymer" means both homopolymers and polymers containing a plurality of different monomeric units. "Copolymer" means either a two-unit polymer or a polymer having a larger number of different kinds of units (a terpolymer, quaterpolymer, etc.).

Thus, the propylene polymer can be a copolymer in the sense of having a plurality of different kinds of monomeric units. In addition, particularly in the case of the heat-sealable embodiment, a mixture of the above-described propylene homopolymers and/or copolymers and/or terpolymers and other poly-olefins, in particular comprising monomers having 2 to 6 carbon atoms, is suitable, where the mixture contains at least 50% by weight, in particular at least 75% by weight, of propylene polymer. Other suitable olefin polymers in the polymer mixture are ethylene polymers such as the polyethylenes, in particular HDPE, LDPE and LLDPE, where the content of these polyolefins is in each case not greater than 15% by weight, based on the polymer mixture.

In general, and in either the heat-sealable or the non-heat-sealable embodiment, the base layer can contain lubricants, anti-statics, stabilizers and/or neutralizers, in effective amounts in each case, and, if desired, hydrocarbon resin.

In a white or opaque or white/opaque embodiment (typically this would be film made according to the heat-sealable embodiment), the base layer additionally contains pigments or vacuole-inducing particles or a combination thereof. Such films have a light transparency measured in accordance with ASTM-D 1033-77 of at most 50%, preferably at most 70%.

The following description relates to the opaque or white/opaque embodiment referred to above.

Pigments for the white or opaque or white/opaque embodiment include particles which result in essentially no vacuole formation on stretching. The coloring action of the pigments is caused by the particles themselves. The term "pigment" is generally associated with a particle size of from 0.01 to a maximum of 1 μm and covers both so-called "white pigments", which color the films white, and "colored pigments" which give the film a colored or black color. In general, the mean particle diameter of the pigments is in the range from 0.01 to 1 μm, preferably from 0.01 to 0.7 μm, in particular from 0.01 to 0.4 μm. The base layer generally contains pigments in an amount of from 1 to 25% by weight, in particular from 2 to 20% by weight, preferably from 5 to 15% by weight, in each case based on the base layer.

Conventional pigments are materials such as, for example, aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which white pigments, such as calcium carbonate, silicon dioxide, titanium dioxide and barium sulfate are preferred.

The titanium dioxide particles comprise at least 95% by weight of rutile and are preferably employed with a coating of inorganic oxides, as usually used as a coating for $TiO_2$ white pigment in papers or paints in order to improve the light fastness. Particularly suitable inorganic oxides include the oxides of aluminum, silicon, zinc and magnesium or mixtures of two or more of these compounds. They are precipitated from water-soluble compounds, for example alkali metal aluminate, in particular sodium aluminate, aluminum hydroxide, aluminum sulfate, aluminum nitrate, sodium silicate or silicic acid, in aqueous suspension. Coated $TiO_2$ particles are described, for example, in EP-A-0 078 633 and EP-A-0 044 515.

The coating may also contain organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and polydiorganosiloxanes and/or polyorganohydrosiloxanes, such as polydimethylsiloxane and polymethylhydrosiloxane.

The coating on the $TiO_2$ particles usually comprises from 1 to 12 g, in particular from 2 to 6 g, of inorganic oxides, if desired additionally from 0.5 to 3 g, in particular from 0.7 to 1.5 g, of organic compounds, in each case based on 100 g of $TiO_2$ particles. It has proven particularly advantageous for the $TiO_2$ particles to be coated with $Al_2O_3$ or with $Al_2O_3$ and polydimethylsiloxane.

Opaque embodiments of the films contain vacuole-inducing particles which are incompatible with the polymer matrix and result in the formation of vacuole-like cavities when the film is stretched, the size, type and number of the vacuoles being dependent on the material and on the size of the solid particles and the stretching conditions, such as stretching ratio and stretching temperature. The vacuoles give the films a characteristic pearl-like opaque appearance, caused by light scattering at the vacuole-polymer matrix interfaces. In general, the mean particle diameter of the vacuole-inducing particles is from 1 to 6 μm, preferably from 1.5 to 5 μm. The base layer generally contains vacuole-inducing particles in an amount of from 1 to 25% by weight.

Conventional vacuole-inducing particles in the base layer are inorganic and/or organic, polypropylene-incompatible materials, such as aluminum oxide, aluminum sulfate, barium sulfate, calcium carbonate, magnesium carbonate, silicates, such as aluminum silicate (kaolin clay) and magnesium silicate (talc), silicon dioxide and titanium dioxide, of which calcium carbonate, silicon dioxide and titanium dioxide are preferred. Suitable organic fillers are the conventional polymers which are incompatible with the polymers of the base layer, in particular those such as HDPE, polyesters, polystyrenes, polyamides and halogenated organic polymers, preference being given to polyesters, such as, for example polybutylene terephthalates or polyethylene terephthalates. For the purposes of the present invention, "incompatible materials or incompatible polymers" is taken to mean that the material or polymer is in the form of a separate particle or a separate phase in the film.

White/opaque films provided with vacuole-inducing particles and with pigment contain the vacuole-inducing particles in an amount of from 1 to 10% by weight, preferably from 1 to 5% by weight, and pigment in an amount of from 1 to 7% by weight, preferably from 1 to 5% by weight.

The density of the opaque or white films can vary within broad limits and depends on the type and amount of fillers. The density is generally in the range from 0.4 to 1.1 $g/cm^3$. Pigmented films have a density in the order of 0.9 $g/cm^3$ or above, preferably in the range from 0.9 to 1.1 $g/cm^3$. Films containing only vacuole-inducing particles have a density of less than 0.9 $g/cm^3$. For packaging films having a content of vacuole-inducing particles of from 2 to 5% by weight, the density is in the range from 0.6 to 0.85 $g/cm^3$. For films having a content of vacuole-inducing particles of from 5 to 14% by weight, the density is in the range from 0.4 to 0.8 $g/cm^3$. Films containing pigments and vacuole-inducing particles have a density in the range from 0.5 to 0.85 $g/cm^3$, depending on the ratio between the pigment content and the content of vacuole-inducing particles.

Returning now to the multilayer film of this invention in general (whether transparent or opaque), films of this invention can, if desired, contain (a) further interlayer(s) between the base and outer layers. This (these) interlayer(s) which may be present essentially comprise(s) propylene polymers or polypropylene mixtures as described above for the base layer. In principle, the base layer and the interlayer(s) can be made of the same or different propylene polymers or mixtures. The melt flow indices of the polymers for the core layer and the interlayer(s) should, as far as possible, be the same. If desired, the MFI of the inter-layer(s) can be somewhat greater, but the difference should not exceed 20%. If desired, additives in effective amounts in each case can be added to the interlayers.

In a preferred embodiment of the novel film, the propylene polymer of the base layer and/or of the inter-layer is peroxidically degraded.

A measure of the degree of degradation of the polymer is the degradation factor A, which gives the relative change in the melt flow index, measured in accordance with DIN 53 735, of the polypropylene, based on the starting polymer.

$$A = \frac{MFI_2}{MFI_1}$$

$MFI_1$=melt flow index of the propylene polymer before addition of the organic peroxide.
$MFI_2$=melt flow index of the peroxidically degraded propylene polymer.

In general, the degradation factor A of the propylene polymer employed is in the range from 3 to 15, preferably from 6 to 10.

Particularly preferred organic peroxides are dialkyl peroxides, where the term alkyl radical is taken to mean a conventional saturated, straight-chain or branched lower alkyl radical having up to six carbon atoms. Particular preference is given to 2,5-dimethyl-2,5-di(t-butylperoxy) hexane and di-t-butyl peroxide.

Polyolefin films of this invention further contain at least one outer layer, which is heat-sealable embodiment (in the heat-sealable embodiment of this invention) or non-heat-sealable (in the non-heat-sealable). In the case of the heat-sealable embodiment, the outer layer essentially comprises heat-sealable polymers of α-olefins having 2 to 10 carbon atoms and approximately spherical ceramic particles and, if desired, further additives in effective amounts in each case. In general, the outer layer comprises from 75 to approximately 100% by weight, in particular from 90 to 99.5% by weight, of the heat-sealable α-olefinic polymer.

In the case of the non-heat-sealable embodiment, the outer layer comprises a polymer which is homopolymeric or substantially homopolymeric and the aforementioned approximately spherical ceramic particles. As in the case of the heat-sealable embodiment, further additives can also be included, if desired. In general, the outer layer comprises from 75 to approximately 100% by weight, in particular from 90 to 99.5% by weight, of the aforementioned homopolymeric or substantially homopolymeric polymer, preferably a propylene polymer.

The propylene polymer generally contains from 95 to 100% by weight, preferably from 98 to 100% by weight, of propylene and generally has a melting point of 140° C. or above, preferably from 150° to 170° C., and generally has a melt flow index of from 0.5 g/10 min to 8 g/10 min, preferably from 2 g/10 min to 5 g/10 min, at 230° C. and a force of 21.6 N (DIN 53 735). Isotactic propylene homopolymer having an atactic content of 15% by weight or less, copolymers of ethylene and propylene having an ethylene content of 3% by weight or less, copolymers of propylene with $C_4$–$C_8$-α-olefins having an α-olefin content of 3% by weight are preferred propylene polymers for the outer layer, particular preference being given to isotactic propylene homopolymer. The percentages by weight given are based on the particular polymer.

Examples of heat-sealable α-olefinic polymers useful in the heat-sealable embodiment of this invention are a copolymer of ethylene and propylene or ethylene and 1-butylene or propylene and 1-butylene or a terpolymer of ethylene and propylene and 1-butylene or a mixture of two or more of said homopolymers, copolymers and terpolymers or a blend of two or more of said homopolymers, copolymers and terpolymers, if desired mixed with one or more of said homopolymers, copolymers and terpolymers, particular preference being given to random ethylene-propylene copolymers having an ethylene content of from 1 to 10% by weight, preferably from 2.5 to 8% by weight or random propylene-1-butylene copolymers having a butylene content of from 2 to 25% by weight, preferably from 4 to 20% by weight, in each case based on the total weight of the copolymer, or random ethylene-propylene-1-butylene terpolymers having an ethylene content of from 1 to 10% by weight, preferably from 2 to 6% by weight, and a 1-butylene content of from 2 to 20% by weight, preferably from 4 to 20% by weight, in each case based on the total weight of the terpolymer, or a blend of an ethylene-propylene-1-butylene terpolymer and a propylene-1-butylene copolymer having an ethylene content of from 0.1 to 7% by weight and a propylene content of from 50 to 90% by weight and a 1-butylene content of from 10 to 40% by weight, in each case based on the total weight of the polymer blend.

The above-described copolymers and terpolymers generally have a melt flow index of from 1.5 to 30 g/10 min, preferably from 3 to 15 g/10 min and generally have a melting point in the range from 120° to 140° C. The above-described blend of copolymers and terpolymers generally has a melt flow index of from 5 to 9 g/10 min and a melting point of from 120° to 150° C. All the melt flow indices given above are measured at 230° C. and a force of 21.6N (DIN 53 735).

If desired all the outer layer polymers described above can be peroxidically degraded in the same way as described above for the base layer, basically the same peroxides being used. The degradation factor for the outer layer polymers is generally in the range from 3 to 15, preferably from 6 to 10.

According to the invention, the outer layer contains approximately spherical particles which essentially comprise a ceramic material and, if desired, have a coating of an organic and/or inorganic substance. For the purposes of the present invention, approximately spherical particles are particles which satisfy the following condition:

$$f = \sqrt{A/(\pi/4)} \ /D_{max}$$

in which f is greater than 0.7, preferably from 0.8 to 1, in particular from 0.9 to 1, A is the cross-sectional area in mm$^2$, and D$_{max}$ is the maximum diameter of the cross-sectional area in mm. The factor f is a measure of the degree of sphericalness of the particles. The closer f is to 1, the closer the shape of the particles is to the ideal spherical shape.

The ceramic material is preferably sodium silicate, aluminum silicate or corresponding mixed silicates, i.e. mixtures of sodium and aluminum silicate and mixed sodium-aluminum silicates. The mean particle diameter is generally in the range from 0.5 to 10 µm, preferably from 1 to 5 µm. The antiblocking agent particles are essentially free from siloxane resin compounds. If desired, the spherical particles have an organic and/or inorganic coating, which is also essentially free from siloxane.

Particularly suitable inorganic coatings include the oxides of aluminum, silicon, zinc or magnesium or mixtures of two or more of these compounds. They are precipitated from water-soluble compounds, for example alkali metal aluminates, in particular sodium aluminate, aluminum hydroxide, aluminum sulfate, aluminum nitrate, sodium silicate or silicic acid, in aqueous suspension. If desired, the coating can also comprise or contain organic compounds containing polar and nonpolar groups. Preferred organic compounds are alkanols and fatty acids having 8 to 30 carbon atoms in the alkyl group, in particular fatty acids and primary n-alkanols having 12 to 24 carbon atoms, and maleic anhydride, polypropylene wax and polyethylene wax.

Surprisingly, there is an interaction of structure and substance of the antiblocking agent particles in the spherical ceramic particles used in accordance with the invention. It has been found that films containing known spherical particles of silicone resin in the outer layer have worse haze and worse gloss. Compared with known antiblocking agent particles having an organic coating, an entirely unexpected improvement in gloss, haze, friction and surface roughness of the film has been found in the novel film. Opaque embodiments of the film likewise exhibit improved gloss and low friction and low surface roughness. Haze is of course unimportant in opaque films.

The novel multilayer film comprises the above-described base layer and at least one outer layer and, if desired, further layers. Preference is given to three-layer embodiments containing outer layers on both sides of the base layer; these outer layers can have the same or different thicknesses and compositions. Preference is also given to five-layer embodiments containing a base layer, interlayers applied to both sides of the base layer, and outer layers on both sides.

The overall thickness of the multilayer polyolefin film according to the invention can vary within broad limits and depends on the intended application. For example, the overall thickness can vary depending upon the nature of the embodiment (heat-sealable vs. non-heat-sealable). In the case of the heat-sealable embodiment, the overall thickness is preferably from 5 to 70 µm, in particular from 10 to 50 µm, the base layer making up from about 50 to 90% of the overall film thickness. In the case of the non-heat-sealable embodiment, the overall thickness is 3 to 100 µm, in particular from 5 to 60 µm, the base layer making up from about 50 to 97% of the overall film thickness. The thickness of the non-heat-sealable outer layer or layers is generally greater than 0.1 µm and is preferably in the range from 0.3 to 2 µm, in particular from 0.5 to 1.5 µm, where outer layers on both sides may have the same or different thicknesses.

In the case of the heat-sealable embodiment, the thickness of the outer layer(s) is generally greater than 0.2 µm and is preferably in the range from 0.3 to 2 µm, in particular from >0.5 to 1 µm, where outer layers on both sides may have the same or different thicknesses.

The thickness of any interlayer(s) present is generally (in the case of both the heat-sealable and non-heat-sealable embodiments), in each case independently of any others, from 1 to 12 µm, preferably from 2 to 8 µm, in particular from 3 to 6 µm. The values indicated are in each case based on one interlayer.

In addition to this selected outer layer additive, the multilayer film according to the invention may additionally contain neutralizers, stabilizers, lubricants, hydrocarbon resins and/or antistatics, in one or more layers. The percentages by weight given below relate to the weight of the respective layer to which the additive has been added.

Neutralizers are preferably dihydrotalcite, calcium stearate and/or calcium carbonate having a mean particle size of at most 0.7 µm, an absolute particle size of less than 10 µm and a specific surface area of at least 40 m$^2$/g. In general, the neutralizer is added in an amount of from 0.02 to 0.1% by weight.

Stabilizers which can be added include the conventional stabilizing compounds for polymers of ethylene, propylene and other α-olefins. The amount in which they are added is between 0.05 and 2% by weight. Particularly suitable are phenolic stabilizers, alkali/alkaline earth metal stearates and/or alkali/alkaline earth metal carbonates. Phenolic stabilizers are preferred in an amount of from 0.1 to 0.6% by weight, in particular from 0.15 to 0.3% by weight, and having a molecular weight of greater than 500 g/mol. Pentaerythrityl tetrakis[3-(3,5-di-tert-butyl-4-hydroxyphenyl)propionate] and 1,3,5-trimethyl-2,4,6-tris(3,5-di-tert-butyl-4-hydroxybenzyl)-benzene are particularly advantageous.

Lubricants useful in this invention include higher aliphatic acid amides, higher aliphatic acid esters, waxes and metal soaps, and polydimethylsiloxanes. The effective amount of lubricant is in the range from 0.1 to 3% by weight. The addition of higher aliphatic acid amides in the range from 0.15 to 0.25% by weight to the base layer and/or the outer layers is particularly suitable. A particularly suitable aliphatic acid amide is erucamide.

Hydrocarbon resins are low-molecular-weight polymers whose molecular weight is generally in the range from 300 to 8000, preferably from 400 to 5000, in particular from 500 to 2000. The molecular weight of the resins is thus significantly lower than that of the propylene polymers forming the main component of the individual film layers, which generally have a molecular weight of greater than 100,000. The hydrocarbon resins are preferably added to the base layer and/or the interlayer(s). The effective amount of low-molecular-weight resin is from 1 to 20% by weight, preferably from 2 to 10% by weight, based on the layer.

The low-molecular-weight resin particularly preferred for use in this invention is a natural or synthetic resin having a softening point of from 60° to 180° C., preferably from 80° to 150° C., determined in accordance with ASTM E-28. Of the numerous low-molecular-weight resins, preference is given to hydrocarbon resins, specifically in the form of petroleum resins, styrene resins, cyclopentadiene resins and terpene resins (these resins are described in Ullmanns Encyklopädie der technischen Chemie [Ullmann's Encyclopedia of Industrial Chemistry], 4th Edition, Volume 12, pages 525 to 555). Suitable petroleum resins are described in numerous specifications, such as, for example, EP-A-0 180 087, to which reference is expressly made here.

Preferred antistatics are alkali metal alkane sulfonates, polyether-modified, i.e. ethoxylated and/or propoxylated, polydiorganosiloxanes (polydialkylsiloxanes, polyalkylphenylsiloxanes and the like) and/or the essentially straight-chain and saturated, aliphatic, tertiary amines containing an aliphatic radical having 10 to 20 carbon atoms which are substituted by ω-hydroxy-($C_1$–$C_4$)-alkyl groups, N,N-bis(2-hydroxyethyl)alkylamines having 10 to 20 carbon atoms, preferably 12 to 18 carbon atoms, in the alkyl radical being particularly suitable. The effective amount of antistatic is in the range from 0.05 to 3% by weight. A further preferred antistatic is glycerol monostearate.

As explained previously, the process of preparing a multilayer film of this invention involves the coextrusion process, which can be essentially conventional and in which, as usual in the coextrusion process, the polymer or polymer mixture of individual layers is compressed and liquefied in an extruder, it being possible for any additives already to be present in the polymer or in the polymer mixture or can be added via the masterbatch method. The melts corresponding to the individual layers of the film are then simultaneously coextruded through a flat-film die, and the extruded multilayer film is taken off over one or more take-off rolls, during which it cools and solidifies.

If the spherical ceramic particles are introduced into the outer layer via the masterbatch method, the masterbatch preferably comprises considerably more than 1% by weight of these particles, e.g. 10% by weight or more, essentially the balance of the masterbatch typically being an olefin polymer.

The resultant film obtained from the coextrusion step is stretched longitudinally and transversely to the extrusion direction, which results in orientation of the molecular chains. The stretching is preferably from 4:1 to 7:1 in the longitudinal direction and from 7:1 to 11:1 in the transverse direction. The longitudinal stretching is expediently carried out with the aid of two rolls rotating at different speeds corresponding to the desired stretching ratio, and the transverse stretching is carried out with the aid of an appropriate tenter frame.

The biaxial stretching of the film is followed by heat setting, during which the film is kept at a temperature of from 100° to 160° C. for from about 0.5 to 10 seconds. The film is subsequently wound up in the conventional manner using a wind-up unit.

It has proven particularly favorable to keep the take-off roll or rolls, which also cool and solidify the extruded film, at a temperature of from 20° to 90° C.

The temperatures at which longitudinal and transverse stretching are carried out can vary. In general, the longitudinal stretching is preferably carried out at from 100° to 150° C. In the heat-sealable embodiment of this invention, the transverse stretching is generally carried out at from 155° to 190° C.; in the non-heat-sealable embodiment, this range will typically be 150° to 180° C.

As mentioned above, one or both surfaces of the film can, if desired, be corona- or flame-treated by one of the known methods after the biaxial stretching.

In the case of corona treatment, it is expedient to pass the film between two conductor elements serving as electrodes, with such high voltage, usually an alternating voltage (from about 10 to 20 kV and 20 to 40 kHz) being applied between the electrodes so that spray or corona discharges can occur. The spray or corona discharge ionizes the air above the film surface, causing it to react with the molecules of the film surface, so that polar inclusions are formed in the essentially nonpolar polymer matrix.

For flame treatment with a polarized flame (cf. U.S. Pat. No. 4,622,237), a direct electrical voltage is applied between a burner (negative pole) and a chill roll. The level of the applied voltage is between 500 and 3000 V, preferably in the range from 1500 to 2000 V. Owing to the applied voltage, the ionized atoms accelerate and hit the polymer surface with greater kinetic energy. The chemical bonds within the polymer molecule are easier to break, and free-radical formation proceeds more quickly. The thermal load on the polymer during this is significantly less than in the case of standard flame treatment, and films can be obtained in which the heat-sealing properties of the treated side are even better than those of the untreated side.

AN oriented, multilayer olefin polymer film of this invention has improved gloss and haze compared with known films having a low coefficient of friction and is also distinguished by a very low coefficient of friction and by low surface roughness. In addition, in the case of the heat-sealable embodiment of this invention, the film has a low minimum heat-sealing temperature. The coefficient of sliding friction of lubricant-free embodiments of the films is generally in the range from 0.3 to 0.7, preferably from 0.3 to 0.5. Films which additionally contain a lubricant, such as, for example, a fatty acid amide, in particular erucamide, have an even further reduced coefficient of sliding friction. In the case of films containing erucamide in the base layer, this is generally in the range from 0.05 to 0.3, preferably from 0.1 to 0.2. The gloss of a heat-sealable embodiment of this invention is in the range of from 90 to 130, preferably from 105 to 130. The gloss of a non-heat-sealable embodiment of this invention is in the range of from 100 to 150, preferably from 110 to 140. The haze of transparent embodiments is in the range from 0.9 to 3.0, preferably in the range from 0.9 to 2.0.

The invention is now described in greater detail with reference to the following non-limiting working examples. Examples 1A, 2A, and Comparative Examples 1A to 4A relate to the heat-sealable embodiment of this invention. Examples 1B, 2B, and Comparative Examples 1B to 4B relate to the non-heat-sealable embodiment of this invention.

EXAMPLE 1A

A three-layer film having an overall thickness of 20 μm and an ABA layer structure, i.e. the base layer B was surrounded by two identical outer layers A, was produced by coextrusion and subsequent stepwise orientation in the longitudinal and transverse directions.

The film was subjected to corona treatment on one side (the roll side) before rolling up. The roll side is the side of the film in contact with the first take-off roll. The surface tension on this side as a consequence of this treatment was from 39 to 40 mN/m. All layers contained 0.13% by weight of pentaerythrityl tetrakis[4-(3,5-di-tert-butyl-4-hydroxyphenyl)propionate] (®Irganox 1010) as stabilizer and 0.06% by weight of calcium stearate as neutralizer.

The base layer B essentially comprised a polypropylene homopolymer having an n-heptane-soluble content of 4% by weight and a melting range of from 160° to 162° C. The melt flow index of the polypropylene homopolymer was 3.4 g/10 min at 230° C. and a load of 21.6N (DIN 53 735). The base layer contained 0.12% by weight of erucamide having a melting range of from 78° to 82° C. and 0.12% by weight of N,N-bisethoxyalkylamine (®Armostat 300).

The polyolefinic outer layers essentially comprised an ethylene-propylene-1-butene terpolymer having a content of 3.5% by weight of ethylene, 88.5% by weight of propylene and 8% by weight of 1-butene. The outer layers contained 0.33% by weight of a ceramic, spherical anti-blocking agent having a mean particle diameter of 2 μm. Each of the outer layers had a thickness of 0.8 μm.

Comparative Example 1A

Example 1A was repeated, but the antiblocking agent used was 0.33% by weight of a crosslinked silicone resin powder having a mean particle diameter of 2 μm (®Tospearl 20 from Toshiba Silicone Co., Ltd.).

Comparative Example 2A

Example 1A was repeated, but the antiblocking agent used was 0.33% by weight of an organically coated silicon dioxide having a mean particle diameter of 2 μm (®Sylobloc 44 from Grace).

EXAMPLE 2A

Example 1A was repeated, but the base layer contained no erucamide.

Comparative Example 3A

Comparative Example 1A was repeated, but the base layer contained no erucamide.

Comparative Example 4A

Comparative Example 2A was repeated, but the base layer contained no erucamide.

EXAMPLE 1B

A three-layer film having an overall thickness of 12 μm and an ABA layer structure, i.e. the base layer B was surrounded by two identical outer layers A, was produced by coextrusion and subsequent stepwise orientation in the longitudinal and transverse directions.

The film was subjected to corona treatment on one side (the roll side) before rolling up. The roll side is the side of the film in contact with the first take-off roll. The surface tension on this side as a consequence of this treatment was from 39 to 40 mN/m. All layers contained 0.13% by weight of pentaerythrityl tetrakis[4-(3,5-di-tert-butyl-4-hydroxyphenyl)propionate] (®Irganox 1010) as stabilizer and 0.06% by weight of calcium stearate as neutralizer.

The base layer B essentially comprised a propylene homopolymer having an n-heptane-soluble content of 4% by weight and a melting range of from 160° to 162° C. The melt flow index of the polypropylene homopolymer was 3.4 g/10 min at 230° C. and a load of 21.6N (DIN 53 735). The base layer contained 0.12% by weight of erucamide having a melting range of from 78° to 82° C. and 0.12% by weight of N,N-bisethoxyalkylamine (®Armostat 300).

The polyolefinic outer layers essentially comprised an isotactic propylene homopolymer having an n-heptane-soluble content of 4.0% by weight and a melting point of 160° C. The melt flow index of the homopolymer was 3.6 g/10 min (DIN 53 735). The outer layers contained 0.33% by weight of a ceramic, spherical anti-blocking agent having a mean particle diameter of 2 μm. Each of the outer layers had a thickness of 0.4 μm.

Comparative Example 1B

Example 1B was repeated, but the antiblocking agent used was 0.33% by weight of a crosslinked silicone resin powder having a mean particle diameter of 2 μm (®Tospearl 20 from Toshiba Silicone Co., Ltd.).

Comparative Example 2B

Example 1B was repeated, but the antiblocking agent used was 0.33% by weight of an organically coated silicon dioxide having a mean particle diameter of 2 μm (®Sylobloc 44 from Grace).

EXAMPLE 2B

Example 1B was repeated, but the base layer contained no erucamide.

Comparative Example 3B

Comparative Example 1B was repeated, but the base layer contained no erucamide.

Comparative Example 4B

Comparative Example 2B was repeated, but the base layer contained no erucamide.

The properties of the films of the examples and comparative examples are shown in the table below. The raw materials and films were characterized using the following measurement methods:
Melt flow index The properties of the films of the examples and comparative examples are shown in the table below. The raw materials and films were characterized using the following measurement methods:
Melt flow index The melt flow index was measured in accordance with DIN 53 735 at a load of 21.6N and at 230° C.
Melting point DSC measurement, maximum of the melting curve, heating rate 20° C./min.
Determination of the minimum heat-sealing temperature (Heat-Sealable Examples)

Heat-sealed samples (seal seam 20 mm×100 mm) are produced using a Brugger HSG/ET sealing unit by sealing a film at various temperatures with the aid of two heated sealing jaws at a pressure of 10N/cm$^2$ for 0.5 s. Test strips 15 mm in width are cut out of the sealed samples. The T-seal seam strength, i.e. the force necessary to separate the test strips, is determined on a tensile testing machine at a peel rate of 200 mm/min, the seal seam plane forming a right angle with the direction of tension. The minimum heat-sealing temperature is the temperature at which a seal seam strength of at least 0.5N/15 mm is achieved.
Seal seam strength
(Heat-Sealable Examples)

For the determination, two 15 mm wide film strips were laid one on top of the other and heat-sealed for 0.5 seconds at 130° C. and a pressure of 1.5 N/mm$^2$ (Brugger NDS instrument, sealing jaws heated on one side). The seal seam strength was determined by the T-peel method.
Friction The friction was determined in accordance with DIN 53 375. The coefficient of sliding friction was measured 14 days after production.
Surface tension The surface tension was determined by the ink method (DIN 53 364).
Roughness The roughness was determined in accordance with DIN 4768 at a cut-off of 0.25 mm.

Haze

The haze of the film was measured in accordance with ASTM-D 1003-52. The Hölz haze measurement was also carried out in accordance with ASTM-D 1003-52, but, in order to utilize the optimum measuring range, the measurement was carried out on four film layers lying one on top of the other and a 1° slit diaphragm was employed instead of a 4° pinhole diaphragm.

Gloss

The gloss was determined in accordance with DIN 67 530. The reflector value was measured as an optical parameter for the surface of a film. In accordance with the ASTM-D 523-78 and ISO 2813 standards, the angle of incidence was set at 20° or 60°. A light beam hits the planar test surface at the set angle of incidence and is reflected or scattered thereby. The light rays hitting the photoelectronic receiver are indicated as a proportional electrical quantity. The measurement value is dimensionless and must be given together with the angle of incidence.

comprising, in addition to said essentially spherical ceramic particles, a heat-sealable polymer of an α-olefin having 2 to 10 carbon atoms, and when non-heat sealable, comprising, in addition to said essentially spherical ceramic particles, a non-heat-sealable polymer which is homopolymeric or substantially homopolymeric, and wherein said degree of sphericalness, f, is defined as follows:

$$f = \sqrt{A/(\Pi/4)} \; / D_{max}$$

in which f ranges from 0.7 to 1, A is the cross-sectional area in mm², and $D_{max}$ is the maximum diameter of the cross-sectional area in mm.

2. A multilayer olefin polymer film as claimed in claim 1, wherein the essentially spherical ceramic particles have an organic or inorganic coating or a coating which contains both organic and inorganic material.

TABLE A

| A | Gloss Measurement angle 20° | Gloss Measurement angle 60° | Haze Hölz 4 layers | Haze ASTM-D 1003 1-layer | Minimum sealing temperature MST [°C.] 10 N/cm²; 0.5 s A./A | Minimum sealing temperature MST [°C.] 10 N/cm²; 0.5 s B./B | Coefficient of sliding friction A./B | Roughness A./A | Roughness B./B |
|---|---|---|---|---|---|---|---|---|---|
| E1 | 115 | 145 | 22 | 1.4 | 112 | 118 | 0.18 | 0.65 | 0.51 |
| CE1 | 102 | 133 | 43 | 4.2 | 116 | 120 | 0.17 | 0.60 | 0.77 |
| CE2 | 102 | 128 | 41 | 3.7 | 116 | 120 | 0.30 | 1.29 | 1.46 |
| E2 | 115 | 145 | 22 | 1.4 | 112 | 118 | 0.48 | 0.65 | 0.51 |
| CE3 | 102 | 133 | 43 | 4.2 | 116 | 120 | 0.40 | 0.60 | 0.77 |
| CE4 | 102 | 128 | 41 | 3.7 | 116 | 120 | 0.59 | 1.29 | 1.46 |

A = Heat-Sealable Examples
E = Example
CE = Comparative Example
A. = roll side
B. = air side

TABLE B

| B | Gloss Measurement angle 20° | Haze Hölz 4 layers | Haze ASTM-D 1003 1-layer | Coefficient of sliding friction A./B | Roughness A./A | Roughness B./B |
|---|---|---|---|---|---|---|
| E1 | 140 | 10 | 0.7 | 0.18 | 0.35 | 0.38 |
| CE1 | 125 | 18 | 1.2 | 0.17 | 0.37 | 0.36 |
| CE2 | 120 | 17 | 1.3 | 0.25 | 0.41 | 0.45 |
| E2 | 140 | 9 | 0.6 | 0.41 | 0.34 | 0.37 |
| CE3 | 125 | 17 | 1.1 | 0.40 | 0.38 | 0.36 |
| CE4 | 120 | 16 | 1.2 | 0.45 | 0.37 | 0.39 |

B = Non-Heat-Sealable Examples
E = Example
CE = Comparative Example
A. = roll side
B. = air side

What is claimed is:

1. An oriented, multilayer olefin polymer film comprising an olefin polymer-containing base layer and at least one outer layer, wherein at least one outer layer comprises from 0.01 to 1% by weight, based on the weight of the outer layer, of ceramic particles having a degree of sphericalness, f, ranging from 0.7 to 1, and having a mean particle diameter of from 1 to 10 μm, said outer layer being heat-sealable or non-heat-sealable; said outer layer, when heat-sealable, 3. A multilayer olefin polymer film as claimed in claim 1, wherein the essentially spherical ceramic particles have a mean particle diameter of from 1 to 5 μm.

4. A multilayer olefin polymer film as claimed in claim 1, wherein the essentially spherical ceramic particles comprise a silicate.

5. A multilayer olefin polymer film as claimed in claim 4, wherein said silicate is sodium silicate, aluminum silicate, or a corresponding mixed silicate.

6. A multilayer olefin polymer film as claimed in claim 1, wherein the essentially spherical ceramic particles are essentially free of crosslinked silicone resin.

7. A multilayer olefin polymer film as claimed in claim 1, wherein f ranges from 0.8 to 1.

8. A multilayer olefin polymer film as claimed in claim 1, wherein the outer layer of said film has a thickness of from 0.2 to 2 μm.

9. A multilayer olefin polymer film as claimed in claim 1, wherein at least one said outer layer is heat-sealable, and the multilayer film has a light transparency, measured in accordance with ASTM-D 1039-77, of at most 50%.

10. A multilayer olefin polymer film as claimed in claim 1, wherein at least one said outer layer is non-heat-sealable.

11. A multilayer olefin polymer film as claimed in claim 1, wherein said film is biaxially oriented.

12. A film package comprising, as the packaging film thereof, a multilayer olefin polymer film as claimed in claim 1.

13. A multilayer olefin polymer film as claimed in claim 1, wherein said outer layer has printed material thereon.

14. A laminate comprising a multilayer olefin polymer film as claimed in claim 1, wherein said outer layer is laminated to paper or a thermoplastic film.

15. An oriented, multilayer olefin polymer film comprising an olefin polymer-containing base layer and at least one outer layer, wherein at least one outer layer comprises from 0.01 to 1% by weight, based on the weight of the outer layer, of essentially spherical ceramic particles having a mean particle diameter of from 1 to 10 µm, said outer layer being heat-sealable or non-heat-sealable; said outer layer, when heat-sealable, comprising, in addition to said essentially spherical ceramic particles, a heat-sealable polymer of an α-olefin having 2 to 10 carbon atoms, and when non-heat sealable, comprising, in addition to said essentially spherical ceramic particles, a non-heat-sealable polymer which is homopolymeric or substantially homopolymeric.

* * * * *

UNITED STATES PATENT AND TRADEMARK OFFICE
CERTIFICATE OF CORRECTION

PATENT NO. : 5,683,802
DATED : November 4, 1997
INVENTOR(S) : Murschall et al.

It is certified that error appears in the above-identified patent and that said Letters Patent is hereby corrected as shown below:

<u>Title page,</u>
Item [30], Foreign Application Priority Data, delete "44 09 199.2" and insert -- 44 09 119.2 --.

Signed and Sealed this

Nineteenth Day of November, 2002

Attest:

Attesting Officer

JAMES E. ROGAN
*Director of the United States Patent and Trademark Office*